(12) United States Patent
Suzuki

(10) Patent No.: US 12,481,433 B2
(45) Date of Patent: Nov. 25, 2025

(54) MEMORY SYSTEM AND METHOD OF MANAGING ENCRYPTION KEY

(71) Applicant: Kioxia Corporation, Tokyo (JP)

(72) Inventor: Taketoshi Suzuki, Setagaya (JP)

(73) Assignee: Kioxia Corporation, Tokyo (JP)

(*) Notice: Subject to any disclaimer, the term of this patent is extended or adjusted under 35 U.S.C. 154(b) by 365 days.

(21) Appl. No.: 17/304,124

(22) Filed: Jun. 15, 2021

(65) Prior Publication Data

US 2022/0179567 A1 Jun. 9, 2022

(30) Foreign Application Priority Data

Dec. 7, 2020 (JP) .................. 2020-202723

(51) Int. Cl.
| | |
|---|---|
| H04L 9/08 | (2006.01) |
| G06F 3/06 | (2006.01) |
| G06F 21/60 | (2013.01) |
| G06F 21/79 | (2013.01) |
| H04L 9/32 | (2006.01) |
| G06F 21/10 | (2013.01) |

(52) U.S. Cl.
CPC .......... *G06F 3/0623* (2013.01); *G06F 3/0619* (2013.01); *G06F 3/0659* (2013.01); *G06F 3/0679* (2013.01); *G06F 21/602* (2013.01); *G06F 21/79* (2013.01); *H04L 9/0866* (2013.01); *H04L 9/3278* (2013.01); *G06F 21/107* (2023.08)

(58) Field of Classification Search
CPC .... G06F 3/0623; G06F 3/0619; G06F 3/0659; G06F 3/0679; G06F 21/602; G06F 21/79; G06F 2221/0751; H04L 9/0866; H04L 9/3278

See application file for complete search history.

(56) References Cited

U.S. PATENT DOCUMENTS

| | | | |
|---|---|---|---|
| 9,225,512 B1 * | 12/2015 | Trimberger | ........... H04L 9/0866 |
| 9,396,357 B2 * | 7/2016 | Van Der Leest | ..... H04L 9/0866 |
| 10,432,409 B2 | 10/2019 | Wallrabenstein | |
| 10,521,616 B2 | 12/2019 | Wallrabenstein | |
| 10,574,469 B1 * | 2/2020 | Garni | ..................... G11C 11/419 |
| 10,797,891 B2 * | 10/2020 | Yao | ........................ H04L 9/3278 |

(Continued)

FOREIGN PATENT DOCUMENTS

| | | | | |
|---|---|---|---|---|
| JP | 2020-102827 A | 7/2020 | | |
| WO | WO-2011018414 A2 * | 2/2011 | ............. | G06F 21/73 |

(Continued)

*Primary Examiner* — William S Powers
(74) *Attorney, Agent, or Firm* — Oblon, McClelland, Maier & Neustadt, L.L.P.

(57) ABSTRACT

According to one embodiment, a memory system includes a nonvolatile memory and a controller. The controller includes a circuit element. At a first timing, the controller acquires first identification information from a characteristic of the circuit element. The controller generates, using the first identification information, an encryption key for data to be written to the nonvolatile memory. The controller acquires aging information of the first identification information. The controller generates, using the aging information, auxiliary data for correcting an error included in second identification information, which is acquired from the characteristic of the circuit element at a second timing, to restore the first identification information.

22 Claims, 14 Drawing Sheets

(56) References Cited

U.S. PATENT DOCUMENTS

| | | | |
|---|---|---|---|
| 2012/0179952 A1* | 7/2012 | Tuyls | H04L 9/0866 |
| | | | 711/E12.078 |
| 2013/0185611 A1* | 7/2013 | Goettfert | H03M 13/63 |
| | | | 714/766 |
| 2017/0063559 A1 | 3/2017 | Wallrabenstein | |
| 2017/0126414 A1* | 5/2017 | Goel | G06F 3/0679 |
| 2018/0337793 A1* | 11/2018 | Park | H03K 19/003 |
| 2019/0138753 A1 | 5/2019 | Wallrabenstein | |
| 2019/0342104 A1* | 11/2019 | Adams | H04L 9/0822 |
| 2019/0342105 A1* | 11/2019 | Adams | H04L 9/0822 |
| 2020/0267341 A1 | 8/2020 | Baba et al. | |

FOREIGN PATENT DOCUMENTS

| | | | | |
|---|---|---|---|---|
| WO | WO 2017/110483 A1 | 6/2017 | | |
| WO | WO-2019036356 A1 * | 2/2019 | | G06F 21/44 |

* cited by examiner

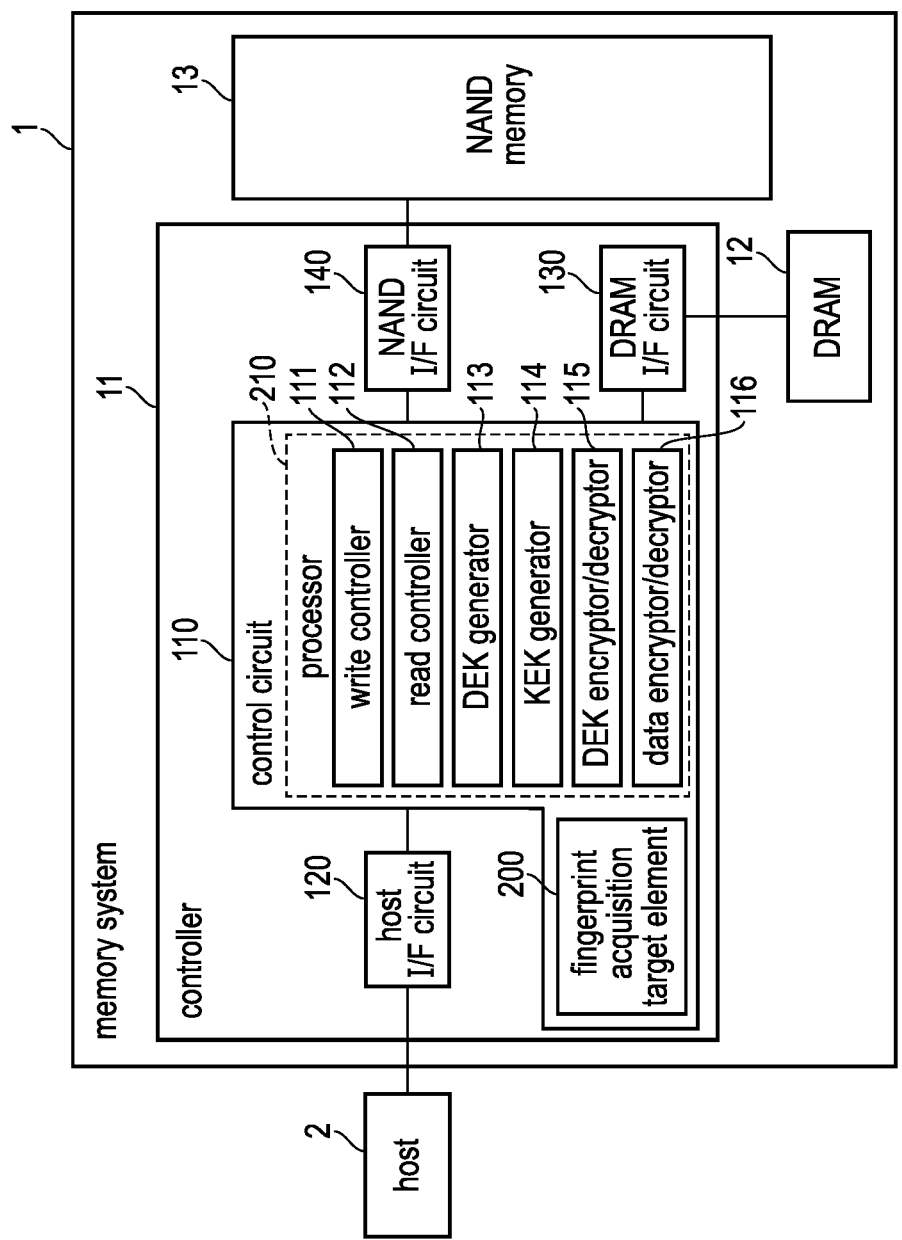
F I G. 1

|  | PUF output | secure sketch |
|---|---|---|
| initial | W | S |
| aging variation after certain time has elapsed ($t_0 < t_1 < t_2$) | $\Delta W_0$ | $\Delta S_0$ |
|  | $\Delta W_1$ | $\Delta S_1$ |
|  | $\Delta W_2$ | $\Delta S_2$ |
F I G. 5
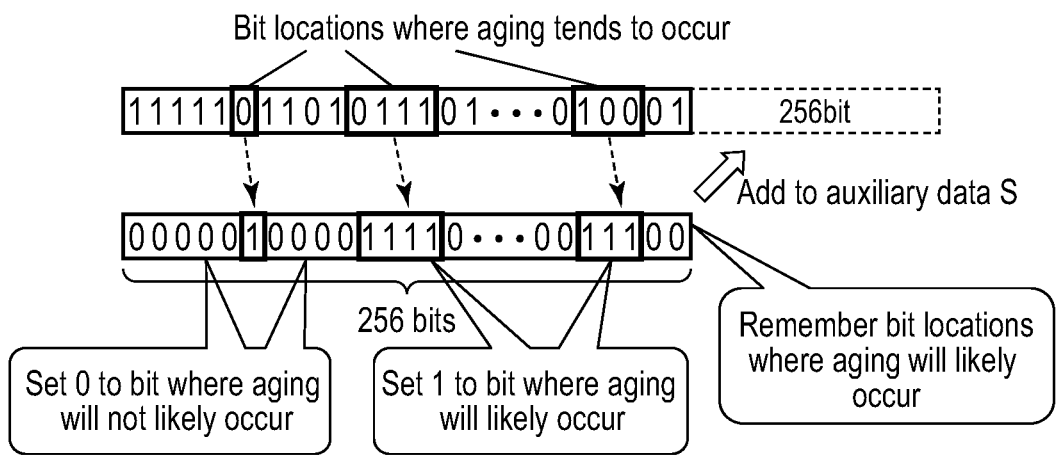
F I G. 6

| | code word length $r_{enc}$ (bits) | message length $r$ (bits) | initial entropy | correctable errors (excluding aging) t (bits) | aging errors | correctable errors (including aging) (bits) |
|---|---|---|---|---|---|---|
| conventional example 1 | 127 | 36 | 36 | 6 | 9 | 15 |
| conventional example 2 | 127 | 36 | 36 | 0 | 15 | 15 |
| conventional example 3 | 127 | 29 | 29 | 6 | 15 | 21 |
| present embodiment | 126(63+63) | 36 | 36 | 6 | 15 | 21(6+15) |

F I G. 7

| | code word length $r_{enc}$ (bits) | message length $r$ (bits) | correctable error bits t (bits) | aging errors |
|---|---|---|---|---|
| initial state (no aging) | 255 | 131 | 18 | 0 |
| comparative example 1 (including aging) | 511 | 130 | 18 | 37 |
| present embodiment | 386(255+131) | 131 | 18 | optional (max.131 bit) |

F I G. 8

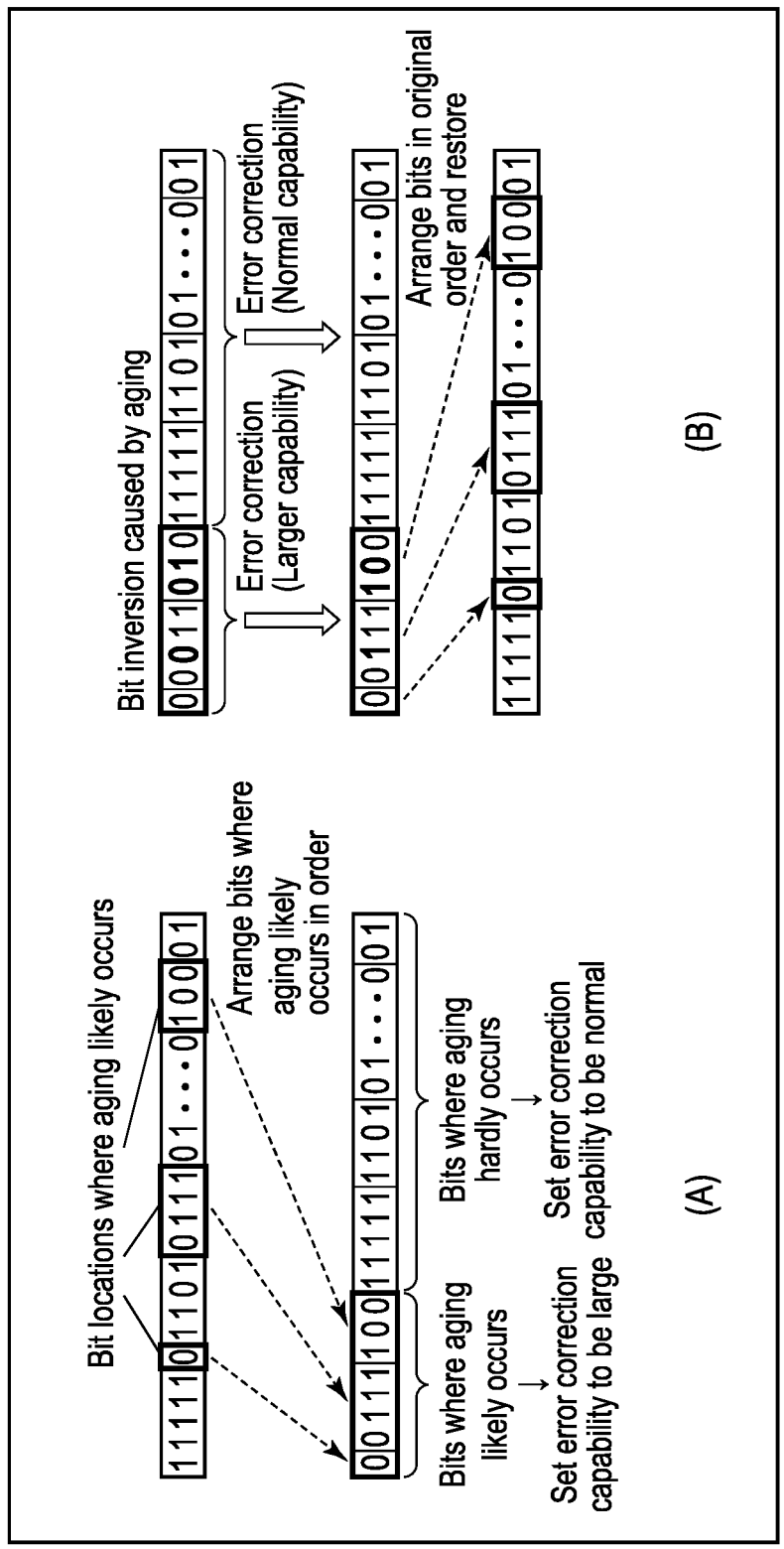
F I G. 9

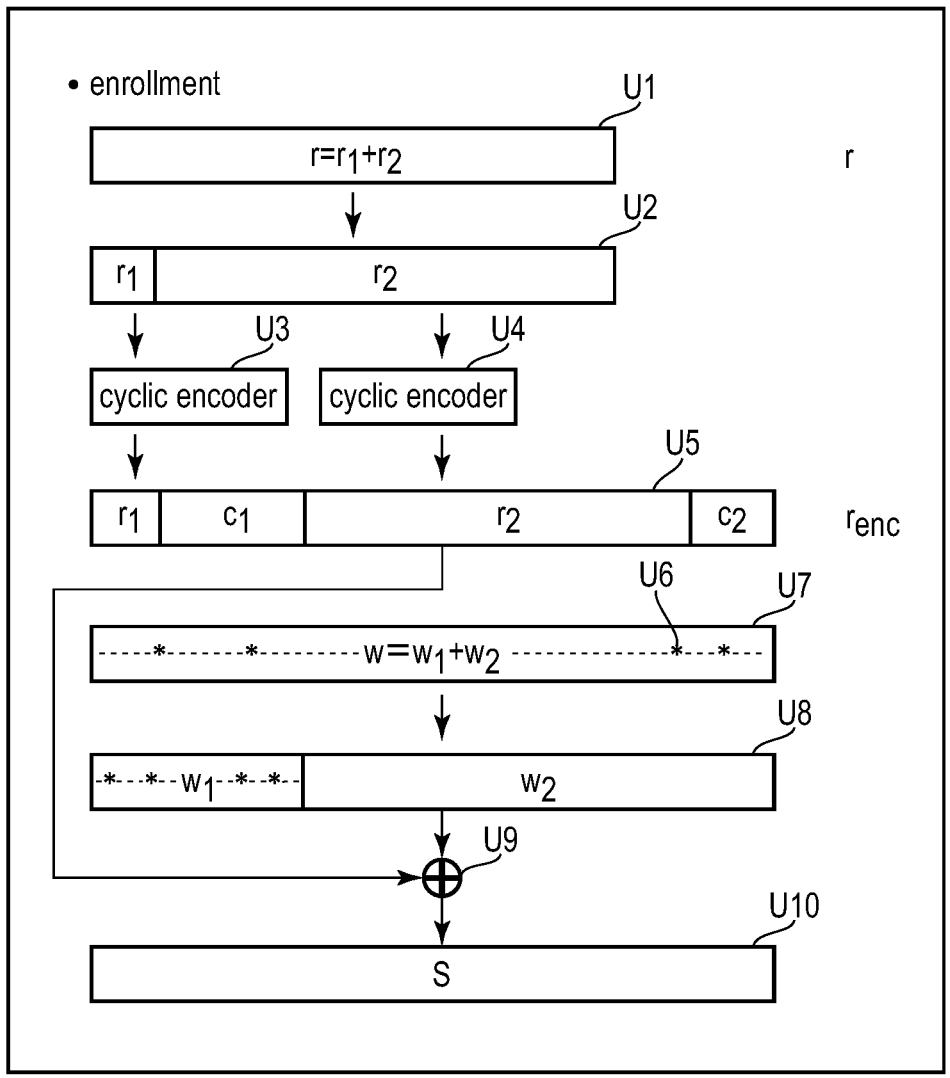
F I G. 10

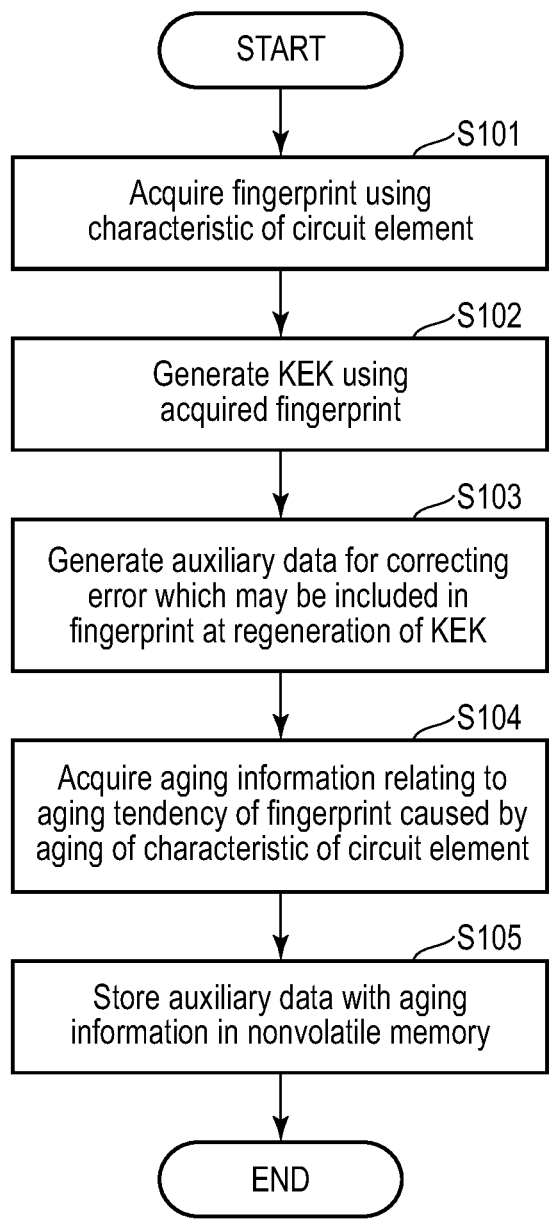
F I G. 12

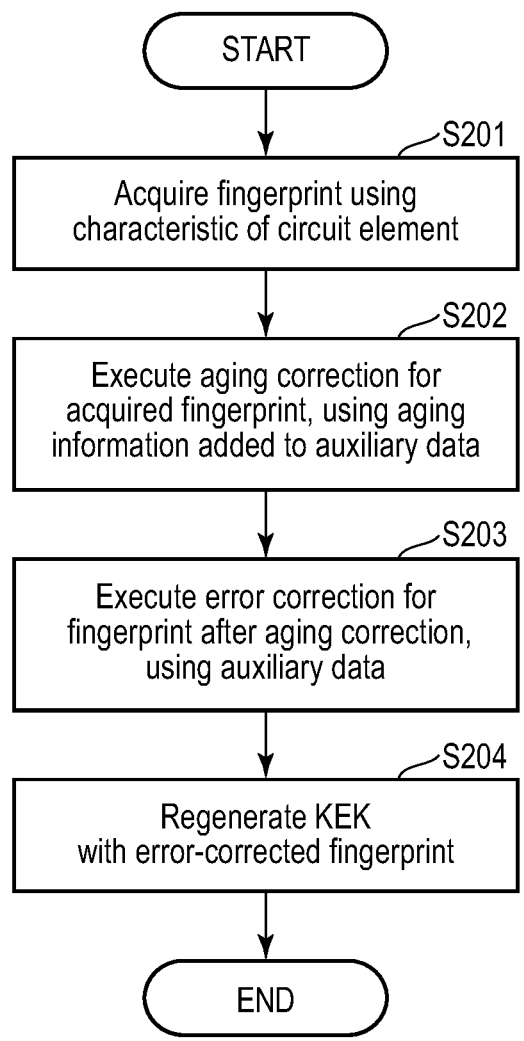
F I G. 13

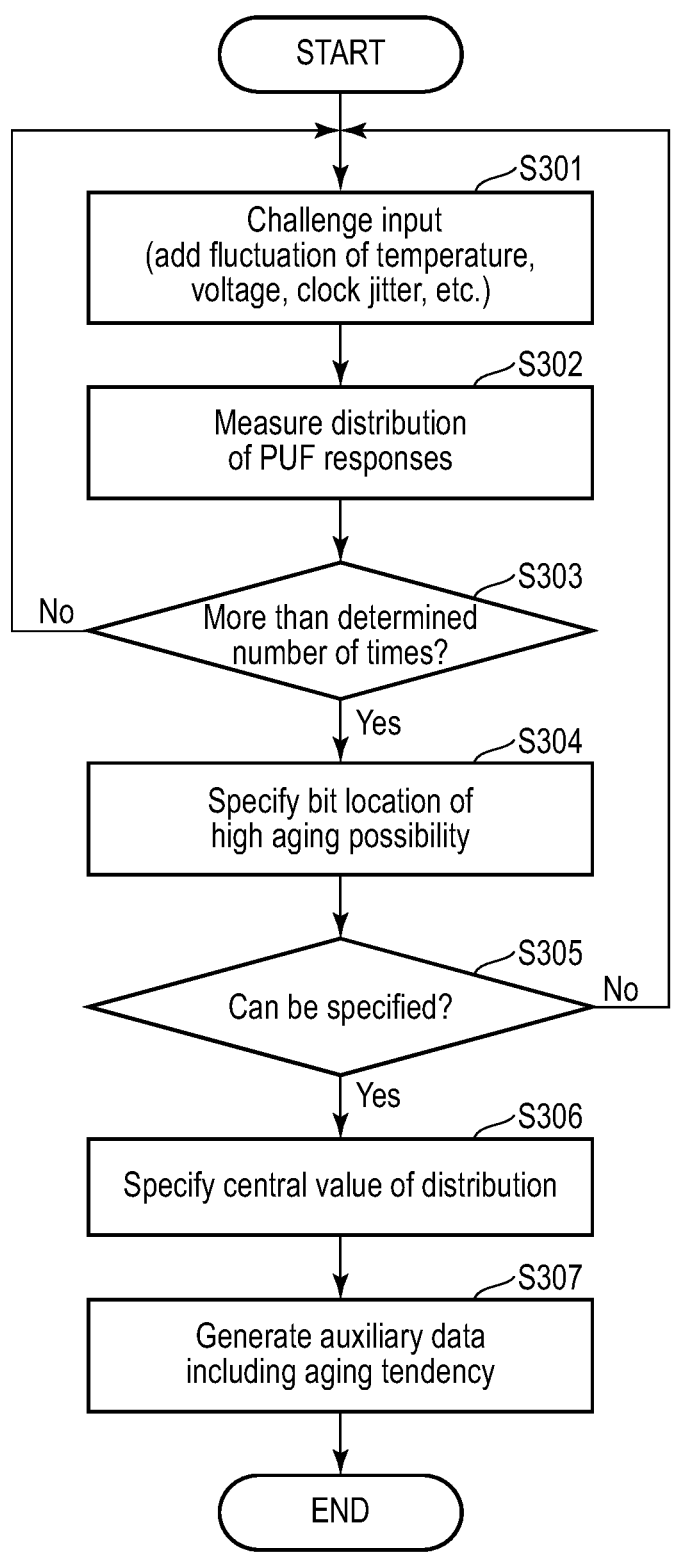
F I G. 14

MEMORY SYSTEM AND METHOD OF MANAGING ENCRYPTION KEY

CROSS-REFERENCE TO RELATED APPLICATIONS

This application is based upon and claims the benefit of priority from Japanese Patent Application No. 2020-202723, filed Dec. 7, 2020, the entire contents of which are incorporated herein by reference.

FIELD

Embodiments described herein relate generally to a memory system and a method of managing an encryption key.

BACKGROUND

In recent years, a memory system that includes a nonvolatile memory is widely prevailing. A memory system such as a solid state drive (SSD), which includes a NAND flash memory, is used as a storage of an information processing apparatus such as a server or a personal computer (PC).

In addition, recently, interest in data security has been increased. In accordance with this, demand on a memory system that implements an encryption function of encrypting data and storing the encrypted data in a nonvolatile memory has been increased.

A physical unclonable function (PUF) that uses variation of characteristics of circuit elements as fingerprints (i.e., identification information) is known as one of security technologies applicable to data encryption. The PUF has a problem of aging of the characteristics of circuit elements.

BRIEF DESCRIPTION OF THE DRAWINGS

FIG. 1 is a diagram illustrating an example of a configuration of a memory system of an embodiment connected to a host.

FIG. 5 is a diagram illustrating a relationship between a fingerprint acquired by PUF and auxiliary data generated by secure sketch in the memory system of the embodiment.

FIG. 6 is a diagram illustrating an example of generating aging information in the memory system according to the embodiment.

FIG. 7 is a diagram illustrating comparison of an error correction capability or initial entropy between a conventional memory system and the memory system of the embodiment.

FIG. 8 is a diagram illustrating comparison of an error correction capability versus a codeword length between the memory system according to the embodiment and a comparative example.

FIG. 9 is a diagram illustrating an example of an aging correction using the aging information in the memory system according to the embodiment.

FIG. 10 is a first diagram illustrating a more concrete example of the aging correction using the aging information in the memory system according to the embodiment.

FIG. 12 is a flowchart illustrating an operation procedure at enrollment (KEK registration) in the memory system according to the embodiment.

FIG. 13 is a flowchart illustrating an operation procedure at authentication (KEK regeneration) in the memory system according to the embodiment.

FIG. 14 is a flowchart illustrating an operation procedure of a first example of generating the auxiliary data including the aging information in the memory system according to the embodiment.

DETAILED DESCRIPTION

Figure 2:
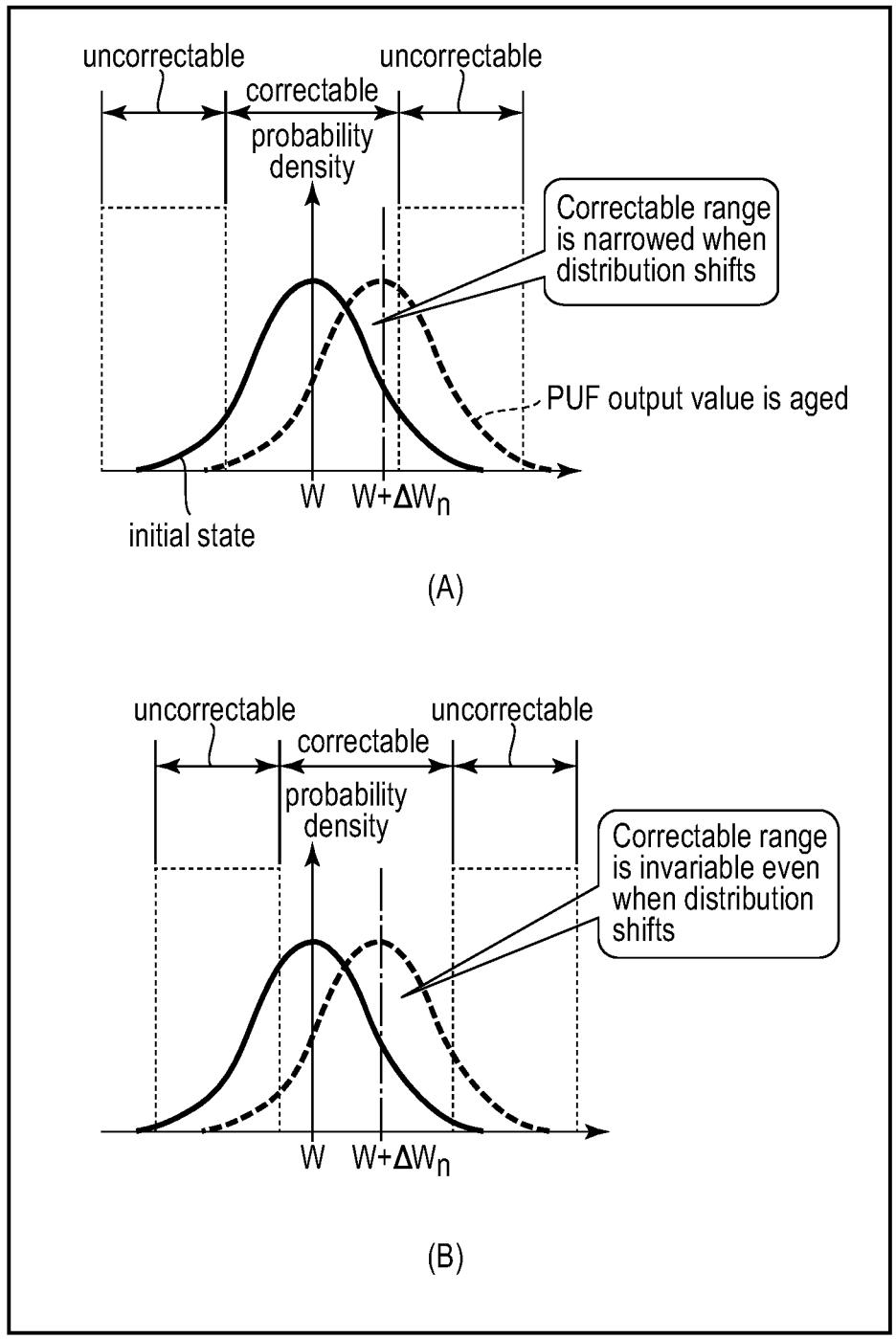
FIG. 2 is a diagram illustrating a relationship between a shift of an output distribution of PUF and an error correctable range.

Various embodiments will be described hereinafter with reference to the accompanying drawings.

In general, according to one embodiment, a memory system includes a nonvolatile memory and a controller. The controller includes a circuit element. At a first timing, the controller acquires first identification information from a characteristic of the circuit element. The controller generates, using the first identification information, a first encryption key relating to encryption of data to be written to the nonvolatile memory. The controller acquires aging information specifying a first bit location and a second bit location of the first identification information. A bit at the first bit location is to be varied from the first identification information to second identification information more likely than a bit at the second bit location if the second identification information is acquired from the characteristic of the circuit element at a second timing. The second timing is later than the first timing. The controller generates, using the aging information, auxiliary data for correcting an error included in the second identification information to restore the first identification information.

FIG. 1 is a diagram illustrating an example of a configuration of a memory system 1 of the embodiment. A configuration of an information processing system incorporating the memory system 1 and a host 2 connected to the memory system 1 is also illustrated in FIG. 1. The host 2 is an information processing apparatus such as a server or a PC.

The memory system 1 includes a controller 11, a dynamic random access memory (DRAM) 12, and a NAND flash memory (NAND memory) 13. The controller 11 is configured as, for example, a system-on-a-chip (SoC).

An example in which the memory system 1 is implemented as a solid state drive (SSD) that includes the NAND memory 13 will be described. However, the memory system 1 is not limited to this, but can be implemented as a hard disk drive (HDD) or the like. The DRAM 12 may be incorporated in the controller 11.

The controller 11 receives a command from the host 2, and executes a process of writing data transferred from the host 2 to the NAND memory 13, a process of reading data requested by the host 2 from the NAND memory 13, and the like, while using the DRAM 12 as a buffer.

The controller 11 includes a control circuit 110, a host interface circuit 120, a DRAM interface circuit 130, and a NAND interface circuit 140.

The control circuit 110 totally controls the operation of the entire memory system 1. The control circuit 110 includes a write controller 111, a read controller 112, a data encryption key (DEK) generator 113, a key encryption key (KEK) generator 114, a DEK encryptor/decryptor 115, and a data encryptor/decryptor 116. Each of the modules 111 to 116 may be implemented by dedicated hardware (e.g., electric circuit). Alternatively, each of the modules 111 to 116 may be implemented by a processor 210 in the controller 11 executing a program.

FIG. 1 illustrates an example in which the processor 210 in the controller 11 executes a program and each of the modules 111 to 116 is thereby implemented. The program is stored in, for example, the NAND memory 13 and loaded in a memory (not illustrated) in the controller 11 and/or the DRAM 12 at a power-on time or a reset time of the memory system 1. The memory in the controller 11 is a volatile memory.

In response to a write command from the host 2, the write controller 111 writes write data related to the write command to the NAND memory 13. In response to a read command from the host 2, the read controller 112 reads read data specified by the read command from the NAND memory 13. The write data and the read data are also referred to as user data in the following descriptions.

The memory system 1 of the present embodiment provides an encryption function for enhancing confidentiality of data in the NAND memory 13.

The DEK generator 113 generates a data encryption key (DEK) for encrypting the user data to be written to the NAND memory 13 or for decrypting the user data read from the NAND memory 13 in an encrypted state. For example, the DEK generator 113 generates the DEK with any value which a user inputs in the host 2. The DEK generator 113 may generate the DEK with, for example, random numbers.

The DEK generated by the DEK generator 113 is encrypted with a key encryption key (KEK) and stored in the NAND memory 13 in an encrypted state. The DEK is read from the NAND memory 13, decrypted with the KEK, and stored in the memory in the controller 11, for example, at the power-on time or reset time of the memory system 1. As described above, the memory in the controller 11 is a volatile memory.

The KEK generator 114 generates the KEK for encrypting the DEK or for decrypting the DEK in the encrypted state. The KEK generator 114 generates the KEK with a fingerprint (i.e., identification information) acquired by the PUF, which is one of the security technologies.

The PUF acquires a fingerprint from the characteristics of a circuit element. The circuit element is, for example, a static RAM (SRAM). The characteristics of the circuit element are, for example, differences between individual circuit elements in an initial state immediately after power-on.

The circuit element for acquiring the fingerprint in the memory system 1 of the present embodiment is provided in the controller 11, more desirably, in the control circuit 110 in which the KEK generator 114 exists. Hereinafter, the circuit element for acquiring the fingerprint is referred to as a fingerprint acquisition target element 200.

The KEK is not stored in the NAND memory 13, but is temporarily stored in the KEK generator 114 only when the DEK is decrypted, and is erased by overwriting after the DEK is decrypted. That is, the KEK is discarded after the DEK is decrypted. As described above, the memory in the controller 11 is a volatile memory.

In registering the KEK, that is, when the KEK is generated for the first time, the KEK generator 114 generates the KEK with the fingerprint and random numbers. In addition, the KEK generator 114 regenerates the KEK which has been erased from the memory in the controller 11, for example, at the power-on time or reset time of the memory system 1.

In registering the KEK, the KEK generator 114 also generates auxiliary data for correcting an error which may be included in the fingerprint at the regeneration of the KEK. The error includes a difference between the fingerprint with which the KEK is registered and the fingerprint with which the KEK is regenerated.

The KEK generator 114 stores the auxiliary data in the NAND memory 13. When regenerating the KEK, the KEK generator 114 restores the fingerprint used at the registration of the KEK, from the fingerprint acquired at the regeneration of the KEK, using the auxiliary data.

A module of generating the auxiliary data and restoring the original fingerprint using the auxiliary data from the fingerprint acquired at the regeneration of the KEK, which may include noise (error), is referred to as a fuzzy extractor. In addition, a module, which is one of the constituent elements of the fuzzy extractor, of generating the auxiliary data is referred to as a secure sketch. That is, the KEK generator 114 implements a function of the fuzzy extractor incorporating the secure sketch. The auxiliary data is also referred to as helper data.

Here, it is assumed that the memory system 1 is taken away by an unauthorized person and is disassembled to find the KEK (i.e., invasion attack). At the disassembly, the characteristics of the circuit element (fingerprint acquisition target element 200) are varied from the characteristics at the time of registering the KEK.

For this reason, the possibility of acquiring substantially the same fingerprint is extremely low. Thus, the KEK at the registration cannot be regenerated since the error cannot be corrected even using the auxiliary data. Without the correctly regenerated KEK, since the DEK cannot be decrypted, confidentiality of data in the NAND memory 13 is maintained. Here, substantially the same fingerprint is a fingerprint so proximate with which the fingerprint at the registration of the KEK can be restored using the auxiliary data.

Alternatively, it is assumed that the NAND memory 13 is configured to be detachable and that the NAND memory 13 in the detached state is taken away (i.e., stolen) by an unauthorized person. Even if the NAND memory 13 is mounted on another memory system of substantially the same specifications, the possibility of acquiring substantially the same fingerprint in said another memory system that includes a physically different circuit element (i.e., fingerprint acquisition target element 200) is extremely low and the confidentiality of the data in the stolen NAND memory 13 is thereby maintained.

The DEK encryptor/decryptor 115 encrypts the DEK or decrypts the DEK in the encrypted state, with the KEK. The data encryptor/decryptor 116 encrypts the user data or decrypts the user data in the encrypted state, with the DEK.

The host interface circuit 120 controls communication with the host 2. The DRAM interface circuit 130 controls communication with the DRAM 12. The NAND interface circuit 140 controls communication with the NAND memory 13.

Incidentally, the fingerprint used at the regeneration of the KEK is varied after registration of the KEK due to aging of the characteristics of the circuit element. FIG. 2 is a diagram illustrating a relationship between a shift of an output distribution of PUF and an error correctable range.

FIG. 2(A) illustrates a relationship in the prior art between a shift of an output distribution of PUF and an error correctable range. The vertical axis is indicative of a probability density, and the horizontal axis is indicative of a PUF output value (e.g., acquired fingerprint).

The auxiliary data is generated so as to correcting a fingerprint W', which is approximate to the fingerprint W that is a peak value of the PUF output in the initial state (in this example, at registration of the KEK), to the fingerprint W. Then, in the prior art, the correctable range using the auxiliary data is a fixed range depending on the fingerprint W, which is the peak value of the PUF output in the initial state.

For this reason, the correctable range is narrowed, that is, the error correction capability is lowered, when the distribution shifts by $\Delta W_n$ due to aging of the characteristics of the circuit element. Here, $\Delta W_n$ is indicative of a shift amount of the distribution due to aging. In addition, to generate the auxiliary data that can compensate for the shift of the distribution to prevent lowering of the error correction capability, the amount of the auxiliary data needs increasing.

Thus, as illustrated in FIG. 2(B), in the memory system 1 of the present embodiment, information on the aging tendency of the fingerprint based on aging of the characteristics of the circuit element (aging information) is acquired at the registration of the KEK.

The aging information is added to the auxiliary data generated at the registration of the KEK. At the regeneration of the KEK, aging correction using the aging information is executed for the acquired fingerprint, and error correction using the auxiliary data is executed for the fingerprint subjected to the aging correction. That is, in the memory system 1 of the present embodiment, the correctable range (width) using the auxiliary data can be made invariable (i.e., not narrowed).

Thus, the memory system 1 of the present embodiment can prevent the error correction capability from being deteriorated due to the aging while suppressing the increase in amount of the auxiliary data.

Figure 3:
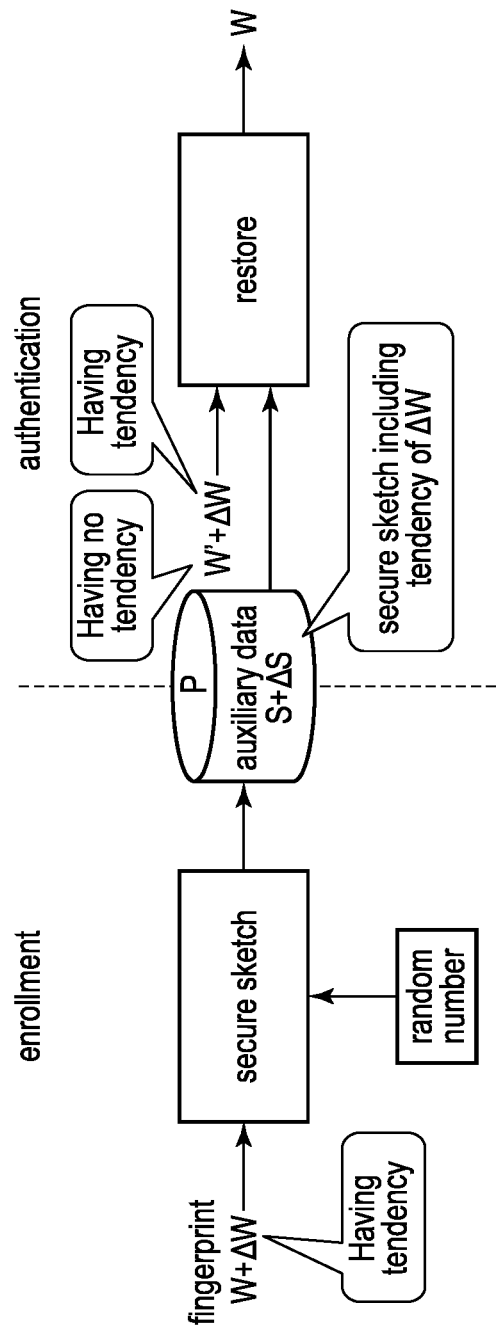
FIG. 3 is a diagram illustrating an outline of a configuration of auxiliary data in the memory system of the embodiment.

FIG. 3 is a diagram illustrating an outline of a configuration of the auxiliary data in the memory system 1 of the present embodiment. Enrollment on the left side of a broken line means a preparation stage and, in the memory system 1 of the present embodiment, the time of registration of the KEK. Authentication on the right side of the broken line means a use stage and, in the memory system 1 of the present embodiment, the time of regeneration of the KEK.

An aging shift amount $\Delta W$ of the fingerprint W, which is acquired from the characteristics of the circuit element (i.e., fingerprint acquisition target element 200), has a tendency inherent to the circuit element. Thus, in the memory system 1 of the present embodiment, aging information $\Delta S$ for correcting the fingerprint W'+$\Delta W$ to the fingerprint W' is generated in addition to the generation of auxiliary data S for correcting the fingerprint W' to the fingerprint W. The auxiliary data S and the aging information $\Delta S$ are often hereinafter referred to as auxiliary data P (i.e., P=S+$\Delta S$). The memory system 1 of the present embodiment generates the auxiliary data P incorporating the tendency ($\Delta S$) of the aging shift amount $\Delta W$.

The memory system 1 of the present embodiment, which generates the auxiliary data P that includes the auxiliary data S and the aging information $\Delta S$, executes aging correction for correcting the acquired fingerprint W'+$\Delta W$ to the fingerprint W' using the aging information $\Delta S$. The memory system 1 of the present embodiment executes error correction for correcting the fingerprint W' subjected to the aging correction to the fingerprint W using the auxiliary data S.

Figure 4:
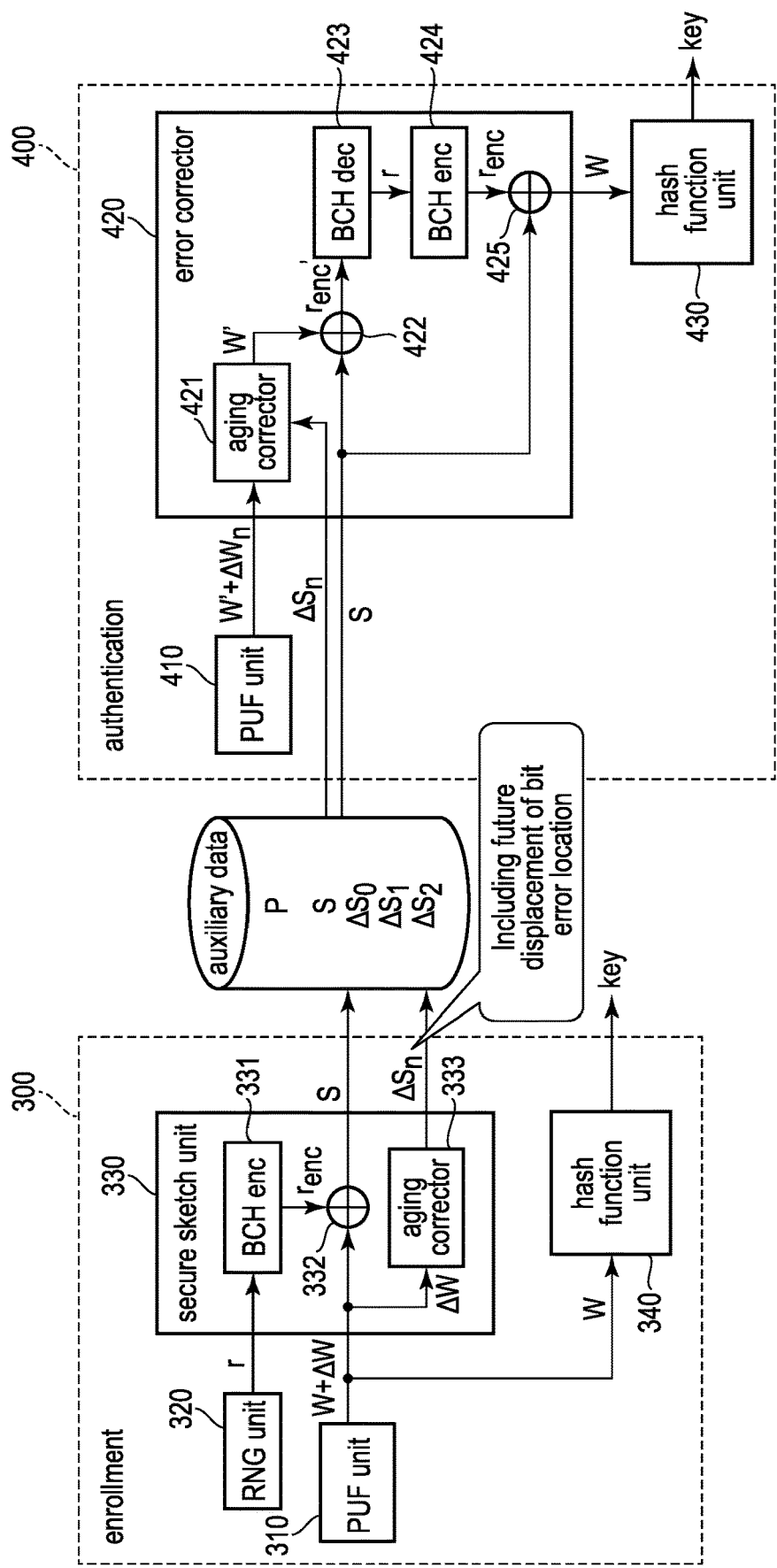
FIG. 4 is a diagram illustrating an example of a configuration of a key encryption key (KEK) generator of the memory system according to the embodiment.

FIG. 4 is a diagram illustrating an example of a configuration of the KEK generator 114.

As described above, the KEK generator 114 implements a function of the fuzzy extractor incorporating the secure sketch. In FIG. 4, a block drawn by a broken line 300 is a block operating in the enrollment, that is, when the KEK is registered. In addition, a block drawn by a broken line 400 is a block operating in the authentication, that is, when the KEK is regenerated.

The block 300, which operates when the KEK is registered, includes a PUF unit 310, a random number generator (RNG) 320, a secure sketch unit 330, and a hash function unit 340. In addition, the secure sketch unit 330 includes a Bose-Chaudhuri-Hocquenghem (BCH) encoder 331, a first logical operator 332, and an aging corrector 333.

The PUF unit 310 acquires the fingerprint W from the characteristics of the circuit element (i.e., fingerprint acquisition target element 200). The random number generator 320 generates a random number r with, for example, a system time.

The BCH encoder 331 of the secure sketch unit 330 generates, using the random number r generated by the random number generator 320, a BCH code $r_{enc}$ for correcting an error which may be included in the fingerprint W' acquired when the KEK is regenerated.

The first logical operator 332 carries out an exclusive-OR operation on the BCH code $r_{enc}$ generated by the BCH encoder 331 and the fingerprint W acquired by the PUF unit 310, and generates the auxiliary data S.

The aging corrector 333 acquires the aging information $\Delta S_n$ from the aging shift amount $\Delta W$. The PUF unit 310 generates the aging shift amount $\Delta W$ by emulating a state of a certain elapsed time of the circuit element (i.e., fingerprint acquisition target element 200), in a pseudo-manner. The state of the certain elapsed time is emulated by adding fluctuation of a temperature, a voltage, a clock jitter, and the like. The acquisition of the aging information $\Delta S_n$ will be described later.

FIG. 5 illustrates a relationship between a fingerprint acquired by the PUF unit 310 and a PUF unit 410 (which will be described later), and the auxiliary data generated by the secure sketch unit 330. W refers to a fingerprint acquired by the PUF unit 310 when the KEK is registered. S refers to auxiliary data generated by the secure sketch unit 330.

$\Delta W_0$ refers to an aging shift amount included in a fingerprint acquired by the PUF unit 410 after time $t_0$ has elapsed. $\Delta S_0$ refers to aging information indicative of the tendency of the aging shift amount $\Delta W_0$ after time $t_0$ has elapsed. The aging information $\Delta S_0$ is generated by the secure sketch unit 330.

$\Delta W_1$ refers to an aging shift amount included in a fingerprint acquired by the PUF unit 410 after time $t_1$ has elapsed. $\Delta S_1$ refers to aging information indicative of the tendency of the aging shift amount $\Delta W_1$ after time $t_1$ has elapsed. The aging information $\Delta S_1$ is generated by the secure sketch unit 330.

$\Delta W_2$ refers to an aging shift amount included in a fingerprint acquired by the PUF unit 410 after time $t_2$ has elapsed. $\Delta S_2$ refers to aging information indicative of the tendency of the aging shift amount $\Delta W_2$ after time $t_2$ has elapsed. The aging information $\Delta S_2$ is generated by the secure sketch unit 330. Note that the above-described $\Delta W$ is a generic term for $\Delta W_0$, $\Delta W_1$, $\Delta W_2$, . . . and the above-described $\Delta S$ is a generic term for $\Delta S_0$, $\Delta S_1$, $\Delta S_2$, . . . .

Returning to FIG. 4, the description of the example of the configuration of the KEK generator 114 will be continued.

The hash function unit 340 generates the KEK from the fingerprint W acquired by the PUF unit 310, with a hash function. As described above, the KEK is not stored in the NAND memory 13. Instead, the auxiliary data P is stored in the NAND memory 13.

In contrast, a block 400, which operates when the KEK is regenerated, includes the PUF unit 410, an error corrector 420, and a hash function unit 430. The PUF unit 410 and the hash function unit 430 are the same as the PUF unit 310 and the hash function unit 340 of the block 300, respectively.

The error corrector 420 includes an aging corrector 421, a second logical operator 422, a BCH decoder 423, a BCH encoder 424, and a third logical operator 425. The BCH encoder 424 is the same as the BCH encoder 331 of the secure sketch unit 330 but may be different therefrom.

The PUF unit 410 acquires the fingerprint $W'+\Delta W_n$ from the characteristics of the circuit element (i.e., fingerprint acquisition target element 200).

The aging corrector 421 of the error corrector 420 executes aging correction for the fingerprint $W'+\Delta W_n$ acquired by the PUF unit 410, with the aging information $\Delta S_n$ added to the auxiliary data S.

The second logical operator 422 carries out an exclusive-OR operation on the auxiliary data S and the fingerprint W' obtained after the aging correction by the aging corrector 421, and generates BCH code $r_{enc}'$. The BCH code $r_{enc}'$ can be regarded as the BCH code $r_{enc}$ (generated by the BCH encoder 331 of the secure sketch unit 330) with an error.

The BCH decoder 423 executes an error correction and decode on the BCH code $r_{enc}'$ to restore the random number r.

The BCH encoder 424 generates the BCH code $r_{enc}$ with the random number r restored by the BCH decoder 423. The third logical operator 425 carries out an exclusive-OR operation on the auxiliary data S and the BCH code $r_{enc}$ generated by the BCH encoder 424, and restores the fingerprint W.

The hash function unit 430 regenerates the KEK from the fingerprint W restored by the second logical operator 425, with a hash function.

When the error correction capability is enhanced such that the fingerprint $W'+\Delta W_n$ can be corrected to the fingerprint W using the auxiliary data S alone, the amount of the auxiliary data S becomes large or the initial entropy is reduced.

In contrast, the memory system 1 of the present embodiment generates the aging information $\Delta S$ for correcting the fingerprint $W'+\Delta W_n$ to the fingerprint W' and adds the aging information $\Delta S$ to the auxiliary data S, which corrects the fingerprint W' to the fingerprint W. The memory system 1 of the present embodiment first corrects the fingerprint $W'+\Delta W_n$ to the fingerprint W' with the aging information $\Delta S$ and then corrects the fingerprint W' to the fingerprint W with the auxiliary data S. By taking these steps, the memory system 1 of the present embodiment prevents reduction of the initial entropy and prevents increase of the amount of the auxiliary data P ($S+\Delta S$).

FIG. 6 is a diagram illustrating an example of generating the aging information $\Delta S$ in the memory system 1 according to the present embodiment.

Here, it is assumed to generate the aging information $\Delta S$ that enables the aging correction to be executed for the data of 256 bits at the longest. The KEK generator 114, more specifically, the aging corrector 333 of the secure sketch unit 330 acquires a plurality pieces of 256-bit data that the PUF unit 310 generates by emulating a state of the certain elapsed time of the circuit element (i.e., fingerprint acquisition target element 200), in a pseudo-manner.

The aging corrector 333 analyzes the acquired plurality pieces of 256-bit data and specifies a bit location where the aging tends to occur. The aging corrector 333 generates the aging information $\Delta S$ of 256 bits, each bit of which corresponds to each bit of data that is to be a target of the aging correction, by setting 0 to a bit location where the aging will not likely occur and setting 1 to a bit location where the aging will likely occur. Note that the target of the aging correction in the present embodiment is the auxiliary data S for correcting the fingerprint W' to the fingerprint W.

FIG. 7 is a diagram illustrating comparison of an error correction capability or initial entropy between a conventional memory system and the memory system 1 of the present embodiment.

It is assumed here that the BCH encoder 331 of the conventional memory system 1 generates a 127-bit (conventional memory system) codeword or a 126-bit codeword (present embodiment). In addition, it is assumed that the initial entropy is 36 bits or 29 bits in an initial state immediately after the registration of the KEK (i.e., at the enrollment). In the initial state, the aging shift amount $\Delta W$ is 0 at the regeneration of the KEK (i.e., at the authentication).

In conventional example 1 and conventional example 2, errors can be corrected up to a total of 15 bits of normal errors and aging errors. Here, the aging errors are errors caused by the aging from the enrollment to the authentication, that is, the errors associated with the aging shift amount $\Delta W$. In contrast, the normal errors are errors caused by other factors than the aging, for example, a variation in temperature or voltage between the enrollment and the authentication.

In conventional example 1, when the aging errors of 9 bits occur, normal errors can be corrected up to only 6 bits because the total error correction capability is 15 bits.

In conventional example 2, when the aging errors of 15 bits occur, error correction can be executed only for the aging errors but not for the normal errors because the total error correction capability is 15 bits.

As in conventional example 3, the error correction capability can be enhanced to total 21 bits including 15 bits for the aging errors and 6 bits for the normal errors. In this case, however, the message length r (i.e., the initial entropy) should be shortened to 29 bits. That is, the security strength is remarkably lowered.

In contrast, the memory system 1 of the present embodiment can correct 6-bit normal errors and 15-bit aging errors without lowering the initial entropy.

FIG. 8 is a diagram illustrating comparison of an error correction capability versus a codeword length between the memory system 1 according to the present embodiment and a comparative example.

It is assumed here that the random number generator 320 generates a random number having the data length (message length) of 130 bits (comparative example) or 131 bits (present embodiment). In addition, it is assumed an error of 18 bits in 130-bit or 131-bit data is required to be corrected in the initial state immediately after the registration of the KEK, (i.e., at the enrollment).

In the initial state, the aging shift amount $\Delta W$ is 0 at the regeneration of the KEK (i.e., at the authentication). Therefore, a required error correction capability is 18 (18+0) bits. In this case, the BCH encoder 331 generates the BCH code $r_{enc}$ of 255 bits to achieve an error correction capability of 18 bits for 131-bit data. For this reason, the auxiliary data P (S) generated by the first logical operator 332 is 255 bits.

The comparative example 1 is an example in which the error correction capability equivalent to that in the initial state is to be maintained for the aging errors of up to 37 bits at the maximum, using the auxiliary data P (S alone; without ΔS). In this case, a required error correction capability is 55 (18+37) bits and the length of the BCH code $r_{enc}$ for correcting an error of 55 bits is 511 bits. Thus, the length of the auxiliary data P (S) is 511 bits.

In contrast, in the memory system 1 of the present embodiment, the error correction capability equivalent to that in the initial state can be maintained for the aging errors of up to 131 bits at the maximum, using the auxiliary data P (S+ΔS). In this case, a required error correction capability is 149 (18+131) bits. The length of the BCH code $r_{enc}$ for correcting an error of 149 bits using the auxiliary data P (S alone; without ΔS) should be much longer than 511 bits of the comparative example 1.

In contrast, in the memory system 1 of the present embodiment of generating the aging information ΔS (131 bits) indicative of the tendency of the aging errors and adding the aging information ΔS to the auxiliary data S, the length of the auxiliary data P (S+ΔS) is 386 (255+131) bits, which is less than 511 bits of the comparative example 1. More specifically, each of auxiliary data P0 (S+ΔS0) for time after $t_0$ has elapsed, auxiliary data P1 (S+ΔS1) for time after $t_1$ has elapsed, and auxiliary data P2 (S+ΔS2) for time after $t_2$ has elapsed is 386 bits. The number of times of generating ΔS in time series may be freely determined depending on specifications.

Thus, the memory system 1 of the present embodiment can prevent the error correction capability from being deteriorated due to the aging while preventing the increase in amount of the auxiliary data.

FIG. 9 is a diagram illustrating an example of the aging correction using the aging information ΔS in the memory system 1 according to the present embodiment.

The bit location where the aging may likely occur can be recognized by referring to the aging information ΔS. Thus, the bits where the aging may likely occur are extracted from the target data of the aging correction and are arranged sequentially. In addition, the other bits of the target data where the aging may hardly occur are also extracted and arranged sequentially. That is, the target data of the aging correction are rearranged so as to be classified into a group of bits where the aging may likely occur and another group of bits where the aging may hardly occur.

An example of arranging the data in the order of the group of the bits where the aging may likely occur and the other group of the bits where the aging may hardly occur will be described but the order may be opposite.

Then, the error correction capability for the group of the bits where the aging may likely occur is set to be more powerful (larger) than the normal capability. Also, the error correction capability for the other group of bits where the aging may hardly occur is set to be the normal capability (FIG. 9(A)).

That is, the memory system 1 of the present embodiment prevents the error correction capability from lowering due to securing a larger initial entropy and the aging while preventing the increase of the auxiliary data amount, and also enhances the error correction capability efficiently by setting it to be more powerful (larger) only for the group of the bits where the aging may likely occur.

The memory system 1 executes error correction for each of the group of the bits where the aging may likely occur and the other group of the bits where the aging may hardly occur, then arranges the error-corrected data in the original order, and restores the target data subjected to the aging correction (FIG. 9(B)).

Figure 11:
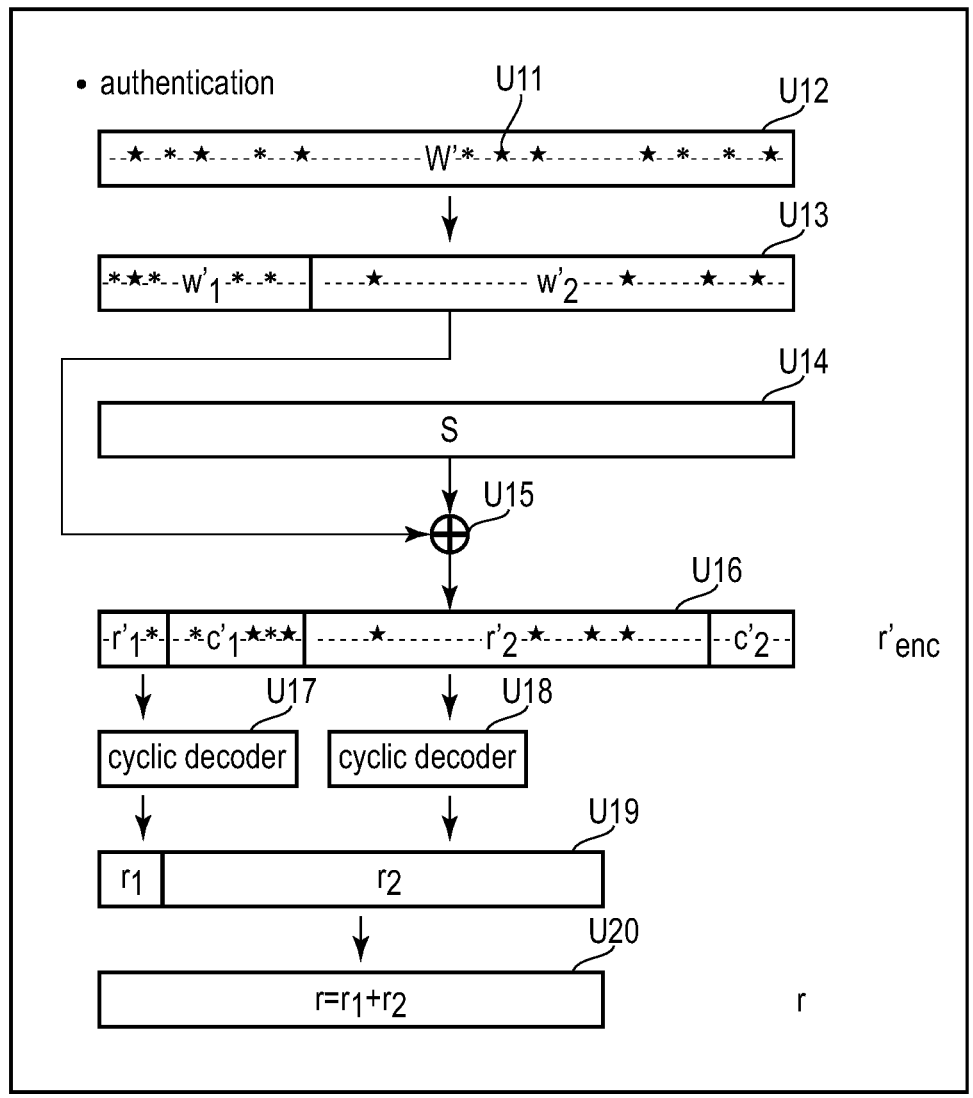
FIG. 11 is a second diagram illustrating a more concrete example of the aging correction using the aging information in the memory system according to the embodiment.

FIG. 10 and FIG. 11 illustrate a more concrete example of the aging correction using the aging information ΔS in the memory system 1 according to the present embodiment.

First, as illustrated in FIG. 10, at the enrollment, a message r (U1) that is the output from the random number generator 320 is divided into r1 and r2 (U2) (i.e., r=r1+r2). A ratio of the bit length of r1 to the bit length of r2 becomes the same as a ratio of the bit length of w1 to the bit length of w2, where w1 and w2 are from the PUF unit 310 and the aging is expected to likely occur in future in w1. That is, $r_1$ and $r_2$ are determined such that $r_1/r_2=w_1/w_2$.

The message $r_1$ is input to a cyclic encoder (U3) corresponding to the BCH encoder 331 having a high (or, powerful) error correction capability to generate a codeword that includes the message $r_1$ and an error correction code $c_1$.

Similarly, the message $r_2$ is input to a cyclic encoder (U4) corresponding to the BCH encoder 331 having a low (or, normal) error correction capability to generate a codeword that includes the message $r_2$ and an error correction code $c_2$.

In contrast, an output w (U7) from the PUF unit 310 includes bits where the aging may likely occur in future (U6 represented by *).

Then, w is divided into $w_1$ and $w_2$ (w=$w_1$+$w_2$) (U8) where $w_1$ is a group of bits extracted from w in which the aging is expected to occur in future, and $w_2$ is a group of the other bits extracted from w in which the aging may hardly occur. Each of the rearranged $w_1$+$w_2$ (U8) and the above-described codeword (U5) is input to an exclusive-OR circuit (i.e., the first logical operator 332) (U9) and the auxiliary data S (U10) is obtained as the output.

Next, as illustrated in FIG. 11, in the authentication, output w' from the PUF unit 410 includes two types of bit errors, that is, an aging error (*) and a normal error (U11 represented by ★). Then, w' is divided into $w_1$' and $w_2$' in the same manner as that of the enrollment (w'=$w_1$'+$w_2$') (U13) where $w_1$' is a group of bits extracted from w' in which the aging is expected to occur, and $w_2$' is a group of the other bits extracted from w' in which the aging may hardly occur.

The rearranged $w_1$'+$w_2$' (U13) and the auxiliary data S (U14) are input to an exclusive-OR circuit (i.e., the second logical operator 422) (U15).

Then, as an output from the exclusive-OR circuit, each of the codeword ($r_1$'+$c_1$'), which includes the aging errors and the normal errors, and the codeword ($r_2$'+$c_2$'), which includes only the normal errors, is obtained. Since it was expected at the enrollment that the codeword ($r_1$'+$c_1$') would include the aging errors and the normal errors, the codeword ($r_1$'+$c_1$') is input to a cyclic code decoder (U17) in the BCH decoder 423 having a powerful error correction capability.

Error-corrected $r_1$ is obtained as an output (U19). Similarly, the codeword ($r_2$'+$c_2$') that includes only the normal errors is input to a cyclic code decoder (U18) in the BCH decoder 423 having a low error correction capability and error-corrected $r_2$ is obtained as an output (U19). Then, $r_1$ and $r_2$ are rearranged to restore the original message r by referring to the aging information ΔS (see FIG. 9(A)).

Note that the lengths of $r_1$+$c_1$ and $r_2$+$c_2$ can be freely selected as long as the required error correction capability can be achieved with a given initial entropy. For example, the lengths may be (63 bits, 63 bits), (127 bits, 63 bits), or (255 bits, 127 bits).

FIG. 12 is a flowchart illustrating an operation procedure at the enrollment (i.e., KEK registration) in the memory system 1 according to the present embodiment.

The memory system 1, more specifically the KEK generator 114, acquires the fingerprint W from the characteristics of the circuit element (i.e., fingerprint acquisition target element 200) (S101).

The memory system 1 generates the key encryption key (KEK) using the acquired fingerprint W (S102).

The memory system 1 generates the auxiliary data S to correct an error which may be included in the fingerprint W'+ΔW at the regeneration of the KEK (S103).

In addition, the memory system 1 acquires the aging information ΔS relating to the aging tendency of the characteristics of the circuit element (S104). Acquaintance of the aging information ΔS will be described with reference to FIG. 13 and FIG. 14.

The memory system 1 stores the auxiliary data S to which the aging information ΔS is added in the nonvolatile memory (NAND memory 13) (S105). The KEK generated in S102 is stored in the volatile memory but is not stored in the nonvolatile memory.

FIG. 13 is a flowchart illustrating an operation procedure at the authentication (i.e., KEK regeneration) in the memory system 1 according to the present embodiment.

The memory system 1, more specifically the KEK generator 114, acquires the fingerprint W'+ΔW from the characteristics of the circuit element (i.e., fingerprint acquisition target element 200) (S201).

The memory system 1 first executes the aging correction for the acquired fingerprint W'+ΔW, using the aging information ΔS added to the auxiliary data S (S202).

Next, the memory system 1 executes the error correction for the fingerprint W' subjected to the aging correction, using the auxiliary data S (S203).

The memory system 1 regenerates the KEK at the enrollment, with the error-corrected fingerprint W' (S204). This KEK is also stored in the volatile memory but is not stored in the nonvolatile memory.

FIG. 14 is a flowchart illustrating an operation procedure of a first example of generating the auxiliary data including the aging information in the memory system 1 according to the present embodiment.

The memory system 1, more specifically the KEK generator 114, executes challenge input for investigating the characteristics of the circuit element (i.e., fingerprint acquisition target element 200) (S301). The challenge input may be executed in any manner as long as some response can be obtained from the circuit element. The memory system 1 repeats the challenge input at a determined number of times or more while adding fluctuation of temperature, voltage, clock jitter and the like. Addition of the fluctuation of temperature, voltage, clock jitter and the like intends to emulate a state of a certain elapsed time of the circuit element, in a pseudo manner.

The memory system 1 measures distribution of responses (PUF responses) acquired from the circuit element for the challenge input (S302). Note that the PUF response is synonymous with the PUF output value of FIG. 2.

The challenge input and the measurement of distribution of the responses repeatedly executed at the determined number of times or more may include those intending the generation of the auxiliary data S, those intending the generation of the aging information $\Delta S_0$, those intending the generation of the aging information $\Delta S_1$, and those intending the generation of the aging information $\Delta S_2$.

When completing the challenge input and the measurement of distribution of the responses at the determined number of times or more (S303: Yes), the memory system 1 specifies the bit location of high aging possibility, of the bit string acquired as the fingerprint, based on the measurement result of the determined number of times or more (S304). When the bit location cannot be specified (S305: No), the memory system 1 executes the processes of S301 to S304 again.

When the bit location of high aging possibility is specified (S305: Yes), the memory system 1 specifies a central value of the distribution of the responses (S306). The memory system 1 generates the auxiliary data S including the aging information ΔS, based on the results of specification of S304 and S306 (S307).

Figure 15:
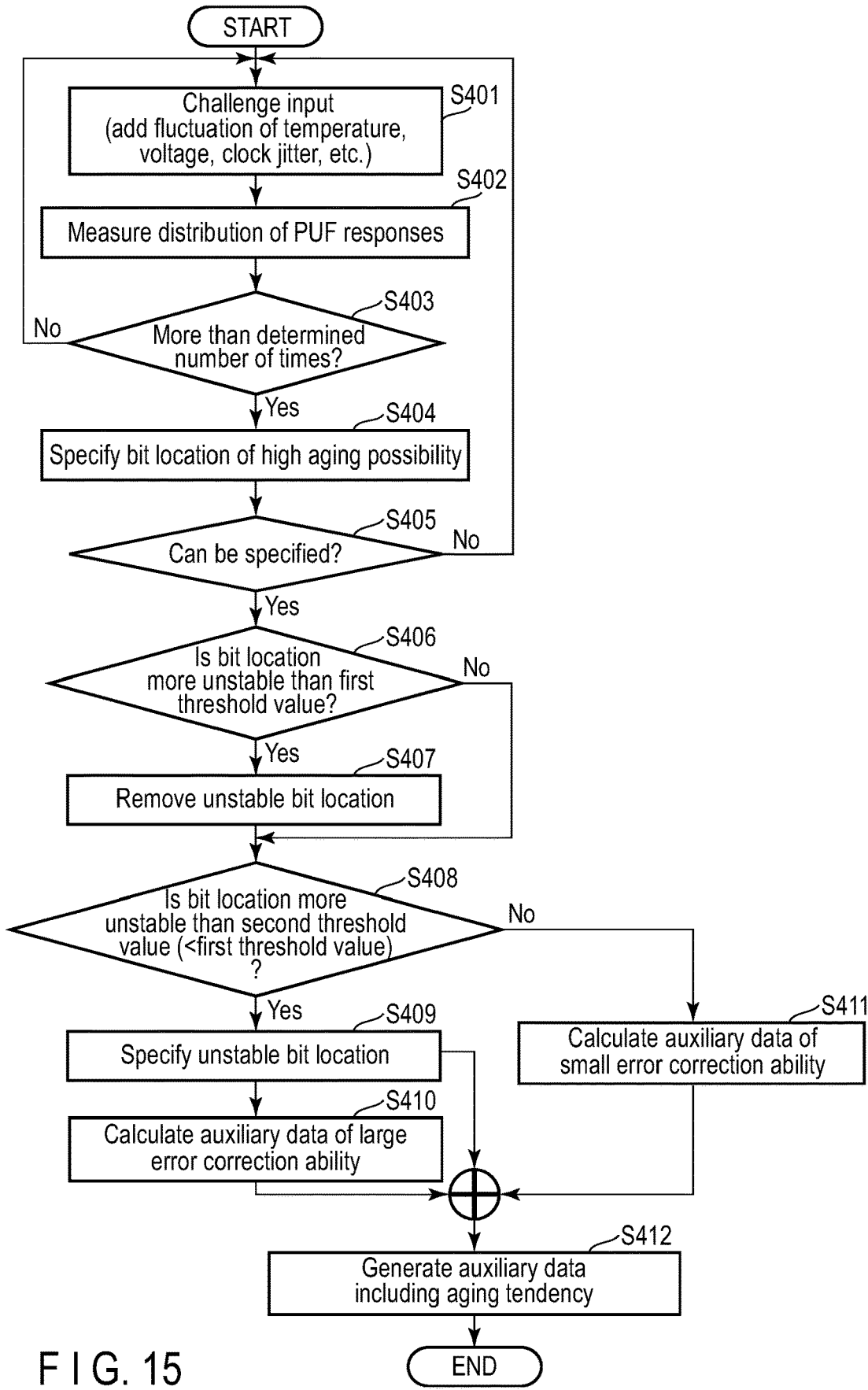
FIG. 15 is a flowchart illustrating an operation procedure of a second example of generating the auxiliary data including the aging information in the memory system according to the embodiment.

FIG. 15 is a flowchart illustrating an operation procedure of a second example of generating the auxiliary data including the aging information in the memory system 1 according to the present embodiment. The key points of the second example are that a bit having extremely high aging possibility is removed, that is, such bit is not used as the fingerprint, and that the auxiliary data of powerful (large) error correction capability is generated for a bit having higher aging possibility.

The processes of S401 to S405 are the same as the processes of S301 to S305 in FIG. 14. When the bit location of high aging possibility is specified (S405: Yes), the memory system 1, more specifically the KEK generator 114, determines whether each of the specified bit location is more unstable than a first threshold value or not (S406). When the bit location is more unstable than the first threshold value (S406: Yes), the memory system 1 removes the unstable bit location (S407).

Subsequently, the memory system 1 determines whether each of the specified bit location is more unstable than a second threshold value or not (S408), where the second threshold value is smaller than the first threshold value. That is, the memory system 1 classifies the bits into a first group of bits more unstable than the second threshold value (S408: Yes) and a second group of the other bits less unstable than the second threshold value (S408: No). The memory system 1 then executes the processes of S409 to S410 for the first group and executes the process of S411 for the second group.

More specifically, for the first group, the memory system 1 specifies the unstable bit location (S409) and calculates the auxiliary data of powerful (large) error correction capability (S410). In contrast, for the second group, the memory system 1 calculates the auxiliary data of normal (small) error correction capability (S411).

The memory system 1 generates the auxiliary data including the aging information by combining the unstable bit location specified in S409, the auxiliary data of powerful (large) error correction capability as calculated in S410, and the auxiliary data of normal (small) error correction capability as calculated in S411 (S412).

As described above, the memory system 1 of the present embodiment can prevent the error correction capability from being deteriorated due to the aging while preventing the increase in amount of the auxiliary data, by including, in the auxiliary data, information on the aging tendency of the fingerprint acquired from the characteristics of the circuit element (i.e., fingerprint acquisition target element 200), at the enrollment.

The example of using the fingerprint which is the output of the PUF to generate the KEK for encrypting the DEK has been described, but its usage is not limited to this. For example, when the DEK is not encrypted with the KEK, the fingerprint may be used to generate the DEK itself. Furthermore, the usage of the fingerprint is not limited to the generation of an encryption key. The method of including the information on the aging tendency of the fingerprint in the auxiliary data as described in the present embodiment can not only be applied to the memory system, but to various systems that attempt enhancement of security with the PUF.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory configured to store data; and
a controller that includes a first interface circuit configured to control a communication with a host, a second interface circuit configured to control a communication with the nonvolatile memory, a control circuit configured to control the first interface circuit and the second interface circuit, execute write operation to the nonvolatile memory and read operation from the nonvolatile memory, and a circuit element in a first circuit, wherein the control circuit is configured to:
at a first timing of enrollment, acquire first identification information from a characteristic of the circuit element and generate, using the first identification information, a first encryption key, the first timing being a timing when registration of the first encryption key occurs, the first encryption key relating to encryption of the data to be written to the nonvolatile memory;
at the first timing of the enrollment, acquire aging information of the first identification information based upon a response distribution, the aging information being specified into a first bit location and a second bit location, a first bit at the first bit location of the first identification information being a bit where aging is expected to occur, a second bit at the second bit location being a bit where aging is not expected to occur; and
generate, using the aging information read from the nonvolatile memory, auxiliary data for correcting an error included in a second identification information acquired from the characteristic of the circuit element at a second timing of authentication in which the first encryption key is regenerated to authenticate, to restore the first identification information, the second timing being a timing when regeneration of the first encryption key occurs after discarding of the first encryption key from the controller, wherein
the first encryption key is not stored to the nonvolatile memory and the aging information is stored to the nonvolatile memory.

2. The memory system of claim 1, wherein
the control circuit is further configured to:
store the auxiliary data and the aging information in the nonvolatile memory but not store the first encryption key in the nonvolatile memory.

3. The memory system of claim 1, wherein
the control circuit is further configured to:
at the second timing, acquire the second identification information from the characteristic of the circuit element;
correct, using the auxiliary data, the error included in the second identification information to restore the first identification information; and
regenerate the first encryption key using the restored first identification information.

4. The memory system of claim 3, wherein
the control circuit is further configured to discard the first encryption key during a period between the first timing and the second timing.

5. The memory system of claim 1, wherein
the control circuit is further configured to:
divide, by referring to the aging information, the first identification information into a first group of bits and a second group of bits, the first group of bits including at least the bit at the first location, the second group of bits including at least the bit at the second location; and
generate the auxiliary data such that an error correction capability for the first group of bits is higher than an error correction capability for the second group of bits.

6. The memory system of claim 1, wherein
the control circuit is further configured to:
generate a random number;
generate an error correction code for the random number;
generate a codeword that includes the random number and the error correction code; and
generate the auxiliary data by performing an exclusive-OR operation on the codeword and the first identification information.

7. The memory system of claim 1, wherein
the control circuit is configured to acquire the aging information by emulating a state of elapsed time of the circuit element, the elapsed time being a time from the first timing to the second timing.

8. The memory system of claim 1, wherein
the control circuit is further configured to:
generate a second encryption key;
encrypt the data to be written to the nonvolatile memory using the second encryption key;
encrypt the second encryption key using the first encryption key; and
store the encrypted second encryption key in the nonvolatile memory.

9. The memory system of claim 1, wherein
the circuit element is a static random access memory and the first identification information is acquired by a physically unclonable function.

10. The memory system of claim 1, wherein
the control circuit is further configured to:
in generating the first identification information, in a case where a bit at a third bit location is expected to be varied than a first threshold value, not use the bit at the third bit location to generate the first identification information.

11. The memory system of claim 1, wherein
the first circuit is configured to be used in the write operation and the read operation.

12. The memory system of claim 1, wherein
the control circuit is configured to rearrange target data of the aging correction so as to be classified into a group of bits where the aging is expected to occur and another group of bits where the aging is not expected to occur.

13. A method of managing an encryption key, comprising:
at a first timing of enrollment, acquiring first identification information from a characteristic of a circuit element and generating, using the first identification information, a first encryption key, the first timing being a timing when registration of the first encryption key occurs, the first encryption key relating to encryption of data to be written to a nonvolatile memory;
at the first timing of the enrollment, acquiring aging information of the first identification information, the aging information being specified into a first bit location and a second bit location, a first bit at the first bit location being a bit where aging is expected to occur, a second bit at the second bit location being a bit where aging is not expected to occur; and
generating, using the aging information, auxiliary data for correcting an error included in a second identification information acquired from the characteristic of the circuit element at a second timing of authentication in which the first encryption key is regenerated to authenticate, to restore the first identification information, the second timing being a timing when regeneration of the first encryption key occurs after discarding of the first encryption key, wherein
the first encryption key is not stored to the nonvolatile memory and the aging information is stored to the nonvolatile memory.

14. The method of claim 13, further comprising:
storing the auxiliary data and the aging information in the nonvolatile memory but not storing the encryption key in the nonvolatile memory.

15. The method of claim 13, further comprising:
at the second timing, acquiring the second identification information from the characteristic of the circuit element;
correcting, using the auxiliary data, the error included in the second identification information to restore the first identification information; and
regenerating the encryption key using the restored first identification information.

16. The method of claim 15, further comprising:
discarding the encryption key during a period between the first timing and the second timing.

17. The method of claim 13, further comprising:
dividing, by referring to the aging information, the first identification information into a first group of bits and a second group of bits, the first group of bits including at least the bit at the first location, the second group of bits including at least the bit at the second location, wherein
the auxiliary data is generated such that an error correction capability for the first group of bits is higher than an error correction capability for the second group of bits.

18. The method of claim 13, further comprising:
generating a random number;
generating an error correction code for the random number; and
generating a codeword that includes the random number and the error correction code, wherein
the auxiliary data is generated by performing an exclusive-OR operation on the codeword and the first identification information.

19. The method of claim 13, wherein
the aging information is acquired by emulating a state of elapsed time of the circuit element, the elapsed time being a time from the first timing to the second timing.

20. The method of claim 13, further comprising:
generating a second encryption key;
encrypting the data to be written to the nonvolatile memory using the second encryption key;
encrypting the second encryption key using the encryption key; and
storing the encrypted second encryption key in the nonvolatile memory.

21. The method of claim 13, wherein
the circuit element is a static random access memory and the first identification information is acquired by a physically unclonable function.

22. The method of claim 13, further comprising:
in generating the first identification information, in a case where a bit at a third bit location is expected to be varied than a first threshold value, not using the bit at the third bit location to generate the first identification information.

* * * * *